June 30, 1970 R. W. KRUG 3,518,364

CHROMINANCE DEMODULATOR SYSTEM FOR COLOR TELEVISION

Filed April 3, 1967 2 Sheets-Sheet 1

Inventor
Robert W. Krug
By John J. Pederson
Attorney

Inventor
Robert W. Krug
By John J. Pederson
Attorney

United States Patent Office 3,518,364

Patented June 30, 1970

3,518,364

CHROMINANCE DEMODULATOR SYSTEM FOR COLOR TELEVISION

Robert W. Krug, Oak Park, Ill., assignor to Zenith Radio Corporation, Chicago, Ill., a corporation of Delaware Filed Apr. 3, 1967, Ser. No. 627,685

Int. Cl. H04n 9/50

U.S. Cl. 178—5.4 9 Claims

ABSTRACT OF THE DISCLOSURE

A color demodulator system comprises two demodulators for deriving first and second color-information signals from a received signal, and a trio of identical intercoupled matrix amplifiers for developing from the two derived signals three control signals suitable for controlling a color image reproducer. By way of illustration, the system may have three triode matrix amplifiers intercoupled by a common cathode impedance. The two color-information signals, X and Z, are applied to first and second ones of the matrix amplifiers wherein they matrix with a signal formed across the common cathode impedance to form $B-Y$ and $R-Y$ color-control signals, respectively. The third control signal, $G-Y$, is formed in the remaining matrix amplifier by combining a portion of the Z color-information signal with the signal developed across the common cathode impedance. All three matrix amplifiers may be identical in design and each may have its own stabilizing feedback network.

BACKGROUND OF THE INVENTION

The present invention relates to improvements in color television receiving systems and more particularly, to an improved color demodulator system for use therein.

In accordance with present U.S. standards governing color television transmission, luminance information, representing elemental brightness variations in the televised image, is transmitted on an amplitude-modulated main carrier component and chrominance information, representing color hue and saturation variations, is transmitted on a phase- and amplitude-modulated 3.58 mHz. subcarrier component. The luminance component is demodulated by a conventional AM video detector, amplified and applied to the three cathodes of the receiver image reproducer, which in present practice takes the form of a three gun tri-color shadow-mask cathode-ray tube. Demodulation of the chrominance component is effected by means of a synchronous detector whereby three color-control signals, commonly designated $R-Y$, $B-Y$ and $G-Y$, are obtained for application to the red, blue and green guns of the image reproducer, respectively. Although these control signals could be derived directly from the subcarrier by means of three separate demodulators, for a number of reasons, including circuit economy, it has become standard practice to utilize two synchronous demodulators operating at demodulation axes other than the red, blue and green axes. Although the exact axes of demodulation chosen for a particular application may depend on several factors, including picture tube phosphor colors and efficiencies, the demodulator output signals have come to be categorically referred to as X and Z signals. The $R-Y$, $B-Y$ and $G-Y$ color-control signals required for the three guns of the image reproducer are obtained from the X and Z signals in a matrix amplifier stage, which may comprise three vacuum tube amplifiers sharing a common cathode impedance as fully explained in U.S. Pat. 3,180,928, issued to John L. Rennick and assigned to the present assignee.

While with the basic common cathode impedance matrix circuit it is theoretically possible to apply the X and Z signals to selected ones of the amplifiers and obtain the desired $R-Y$, $B-Y$ and $G-Y$ control signals by virtue of the common cathode coupling impedance, several practical considerations disfavor this approach. For one, it is highly desirable that the direct-current and signal transfer characteristics of the three matrix amplifiers be substantially identical for faithful color reproduction and minimum color drift with tube aging. Unfortunately, the large disparity in $B-Y$ and $R-Y$ signal levels required for accurately obtaining the $G-Y$ signal in a matrix amplifier by cathode matrixing alone precludes the use of similar amplifiers. This greatly complicates the demodulator system, as elaborate circuitry is required to compensate for the different AC and DC characteristics of the dissimilar matrix amplifiers. Furthermore, for optimum color fidelity it is necessary that the X and Z color demodulators be direct-current coupled to the image reproducer. Since in practical circuits the B+ voltage on the X and Z demodulator anodes precludes DC coupling to the control grids of the matrix amplifiers, it has become standard practice to employ a clamping circuit for establishing a fixed DC reference level in each of the matrix amplifiers. With such a circuit negative horizontal-rate pulses are applied across the common cathode resistor, thus causing each amplifier to periodically draw grid current and charge its associated grid coupling capacitor to a predetermined DC level. It will be appreciated that this clamping circuit could not perform satisfactorily with matrix amplifiers differing to any significant degree because the DC reference levels in the amplifiers would not be equal.

One prior art matrix amplifier circuit attempted to reduce the dissimilarity between amplifiers by means of an auxiliary coupling circuit which coupled a predetermined portion of the $R-Y$ control signal appearing at the anode of the $R-Y$ matrix amplifier back to the control grid of the $G-Y$ matrix amplifier. Although this circuit made the amplifiers less dissimilar, it had the serious disadvantage of preventing the use of stabilizing degenerative feedback between the anode and the cathode of the $G-Y$ matrix amplifier. Degenerative feedback is necessary in a color demodulator system for two reasons; to overcome the bandwidth restrictions otherwise imposed on the matrix amplifiers by the large plate load impedances required for optimum output and circuit economy, and to lend stability to the operation of the matrix amplifiers by automatically compensating for long-term gain variations. Although the cross feed connection of the prior art circuit was effective to a limited extent in improving the bandwidth of the $G-Y$ amplifier, it did not lend stability to that stage, but to the contrary, made the gain of the $G-Y$ matrix amplifier undesirably dependent on the operation of the $R-Y$ amplifier.

SUMMARY OF THE INVENTION

Accordingly, it is a general object of the invention to provide a new and improved color demodulator system for use in a color television receiver.

It is a still more specific object of the invention to provide a new and improved color demodulator system having all matrix amplifiers substantially identical in design.

It is a more specific object of the invention to provide a color demodulator system which offers improved color fidelity and stability at no increase in cost over prior art systems.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
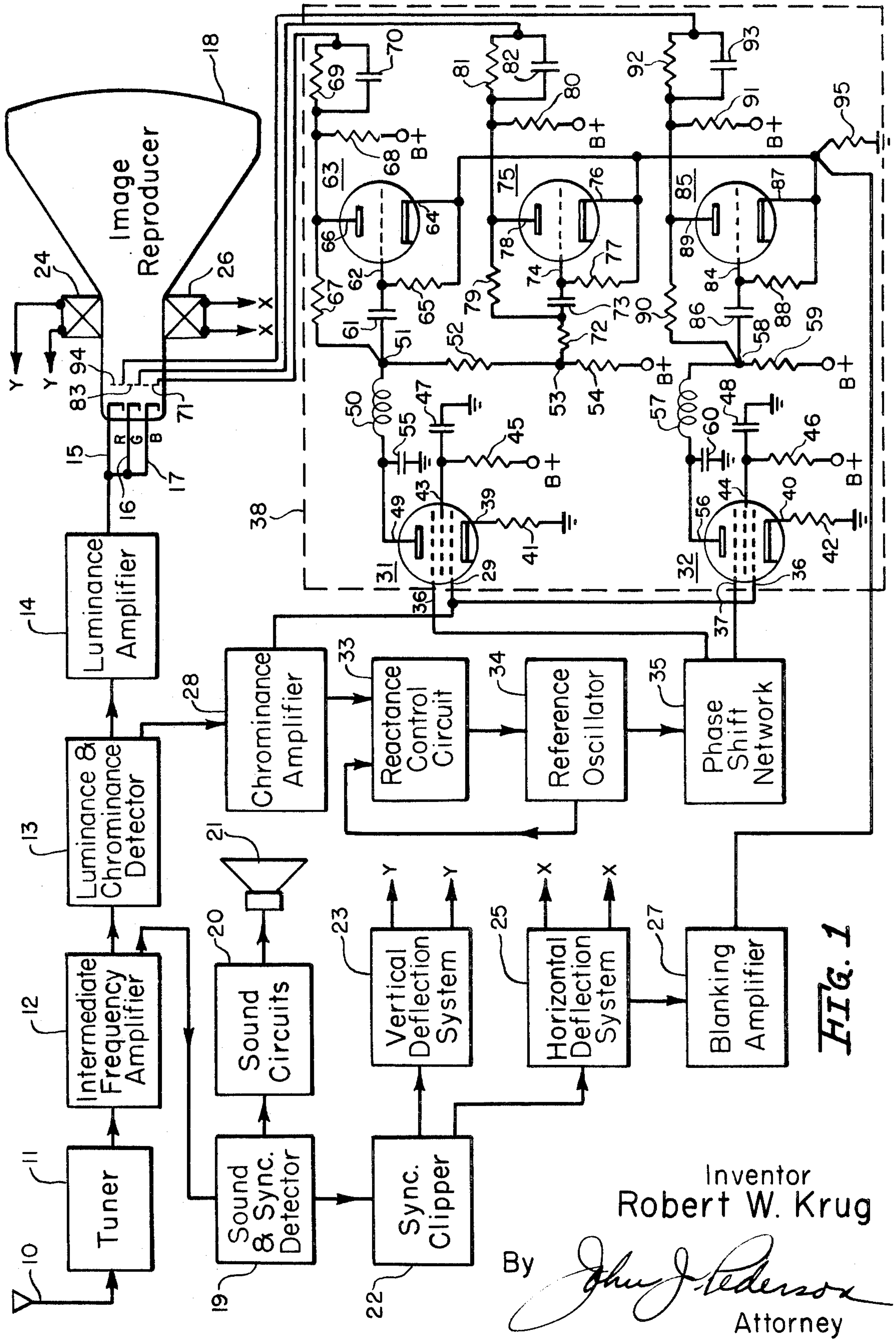
FIG. 1 is a block diagram, partially schematic, of a television receiver having a color demodulator system constructed in accordance with the invention.

With the exception of certain detailed circuitry in the color demodulator system, the receiver illustrated in FIG. 1 is essentially conventional in design and accordingly only a brief description of its structure and operation need be given here. A received signal is intercepted by antenna 10 and coupled in a conventional manner to a tuner 11, which includes the usual radio frequency amplifying and heterodyning stages for translating the signal to an intermediate frequency. After amplification by intermediate-frequency amplifier 12 the signal is applied to luminance and chrominance detector 13, wherein luminance and chrominance information in the form of a composite video signal is derived. The luminance component of the composite signal is amplified in luminance amplifier 14 and applied to the blue, green and red cathodes, 15, 16 and 17 respectively, of image reproducer 18.

The output of intermediate-frequency amplifier 12 is also applied to a sound and sync detector 19, wherein a composite video-frequency signal is derived which includes both sound and synchronizing components. The sound components are applied to sound circuits 20, wherein conventional sound demodulation and amplification circuitry develops an audio output signal suitable for driving speaker 21.

Synchronizing information, in the form of vertical and horizontal sync pulses, is separated from the composite signal by a sync clipper 22. A vertical deflection circuit 23 utilizes the separated vertical sync pulses to generate a synchronizing vertical-rate sawtooth scanning signal in a vertical deflection winding 24. The horizontal sync pulses from sync clipper 20 are applied to a horizontal deflection circuit 25, which utilizes these pulses in generating synchronized horizontal-rate sawtooth scanning current in a horizontal deflection winding 26. A blanking amplifier 27 conected to horizontal deflection circuit 25 provides horizontal-rate recurrent blanking pulses which are utilized by a clamping circuit to establish a DC reference level in the receiver's color demodulator system.

The chrominance components of the composite video frequency output signal of luminance and chrominance detector 13 are applied to a chrominance amplifier 28, which comprises part of the receiver chrominance channel. The amplified chrominance output signal from chrominance amplifier 28 is concurrently applied to the control grids 29 and 30 of pentodes 31 and 32, which comprise part of the receiver color demodulator system and serve as synchronous demodulators at first and second demodulation axes, denoted X and Z, respectively. The output of chrominance amplifier 28 is further applied to a reactance control circuit 33, wherein suitable gating and phase comparison circuitry is utilized to compare the phase of the reference burst contained in the received composite signal with that of a local crystal-controlled 3.58 mHz. oscillator 34. Depending on the phase error, a correction signal is generated which is applied to oscillator 34 to bring that stage into synchronism with the received reference burst. One output of oscillator 34 is coupled back to the phase comparison circuit of reactance control circuit 33 and the other output is applied to a phase shift network 35. The outputs of network 35, at first and second predetermined phases, are applied to the suppressor grids 36 and 37 of pentodes 31 and 32, respectively.

In accordance with the invention, the receiver includes a novel color demodulator system 38 for deriving color-control signals of the form of $R-Y$, $B-Y$ and $G-Y$ for controlling image reproducer 18. The system comprises two synchronous demodulators and three identical matrix amplifiers cross-coupled by a common cathode impedance. The demodulators operate in a conventional manner, utilizing continuous-wave signals from local oscillator 34 at predetermined phases to recover first and second color-information signals, designated X and Z, from the received composite chrominance signal. The X and Z signals are applied to individual ones of the matrix amplifiers, wherein they are matrixed with a cross-coupling signal formed across the common cathode impedance and representing the negative vector sum of the three desired control signal. As a result of this matrixing, $B-Y$ and $R-Y$ color-control signal suitable for controlling the operation of the receiver image reproducer are obtained in the respective devices. The $G-Y$ color control signal is obtained in the remaining matrix amplifier by matrixing the signal developed across the common cathode impedance with a portion of the Z color-information signal. All matrix amplifiers are electrically identical, and each has its own stabilizing feedback network for minimizing long-term color drift.

Pentodes 31 and 32 comprise the synchronous demodulators of demodulator system 38. The cathodes 39 and 40 of these pentodes are connected to ground by resistors 41 and 42, respectively, and the screen grids 43 and 44 are connected to a positive unidirectional current source B+ through screen dropping resistors 45 and 46 and are bypassed to ground by capacitors 47 and 48, respectively.

The anode 49 of Z-axis demodulator 31 is connected to source B+ by a plate load circuit serially comprising an inductance 50, a juncture 51, a resistor 52, a juncture 53, and a resistor 54. A capacitor 55 is connected between anode 49 and ground. The anode 56 of X-axis demodulator 32 is connected to source B+ by a load circuit serially comprising an inductance 57, a juncture 58, and a resistor 59. A capacitor 60 is connected from anode 56 to ground.

Juncture 51 is connected by a capacitor 61 to the control grid 62 of a first triode matrix amplifier 63. The cathode 64 of device 63 is connected by a grid resistor 65 to control grid 62 and the anode 66 is connected to juncture 51 by a feedback resistor 67. Anode 66 is further connected to source B+ by a plate load resistor 68 and to the control grid 71 of the blue gun of image reproducer 18 by the parallel combination of a resistor 69 and a capacitor 70.

Juncture 53 is connected by a resistor 72 and a capacitor 73 to the control grid 74 of a second matrix amplifier 75. The cathode 76 of amplifier 75 is connected to control grid 74 by a resistor 77 and the anode 78 is connected by a feedback resistor 79 to the juncture of resistor 72 and capacitor 73. Anode 78 is further connected by a plate load resistor 80 to source B+ and to the control grid 83 of the green gun of image reproducer 18 by the parallel combination of a resistor 81 and a capacitor 82.

Juncture 58 is connected to the control grid 84 of a third matrix amplifier 85 by a capacitor 86. The cathode 87 of device 85 is connected to control grid 84 by a resistor 88 and the anode 89 is connected to juncture 58 by a feedback resistor 90. Anode 89 is further connected by a plate load resistor 91 to source B+ and to the control grid 94 of the red gun of image reproducer 18 by the parallel combination of a resistor 92 and a capacitor 93. The three cathodes of matrix amplifiers 63, 75 and 85 are connected to ground by a common cathode resistor 95 which in turn is connected to the output of blanking amplifier 27.

In operation, chrominance amplifier 28 supplies a 3.58 mHz. subcarrier amplitude- and phase-modulated with chrominance information to the control grids 29 and 30 of pentodes 31 and 32, the Z and X demodulators. At the same time, a continuous-wave 3.58 mHz. phase-synchronized carrier is applied at appropriate phase angles to the suppressor grids of these pentodes so as to cause the desired Z- and X-axis color-information signals to be produced at anodes 49 and 56 respectively. Inductances 50 and 57, while coupling the Z and X signals to junctures 51 and 58, act in conjunction with capacitors 55 and 60 to form filters for preventing the 3.58 mHz. continuous-wave signal from being so coupled.

It will be recalled that a tri-gun tri-color image reproducer, such as image reproducer 18 in the present figure, requires, in addition to a luminance signal applied to its cathodes, three separate color-control signals representing the difference between the luminance and chromaticity values of an image to be reproduced. In the present embodiment these color-control signals, designated $R-Y$, $B-Y$ and $G-Y$, are produced in a matrix-amplifier network comprising matrix amplifiers 63, 75 and 85.

The Z-axis color-information signal, as it appears at juncture 51, is coupled by capacitor 61 to the control grid 62 of matrix amplifier 63 and the X-axis signal, appearing at juncture 58, is coupled by capacitor 86 to the control grid 84 of amplifier 85. The two color-information signals thus applied to amplifiers 63 and 85 are each matrixed with a third signal vector $E_k$, to obtain the desired $B-Y$ and $R-Y$ color-control signals for image reproducer 18. The signal vector $E_k$, which represents the negative vector sum of the $B-Y$, $R-Y$ and $G-Y$ color-control signals, appears on the cathodes of all three matrix amplifiers by virtue of the common cathode impedance 95. It is necessary that the phase and amplitude of the X and Z color-information signals be carefully controlled in order that $B-Y$ and $R-Y$ color-control signals of proper phase and magnitude appear at the anodes of matrix amplifiers 63 and 85, respectively.

Figure 2:
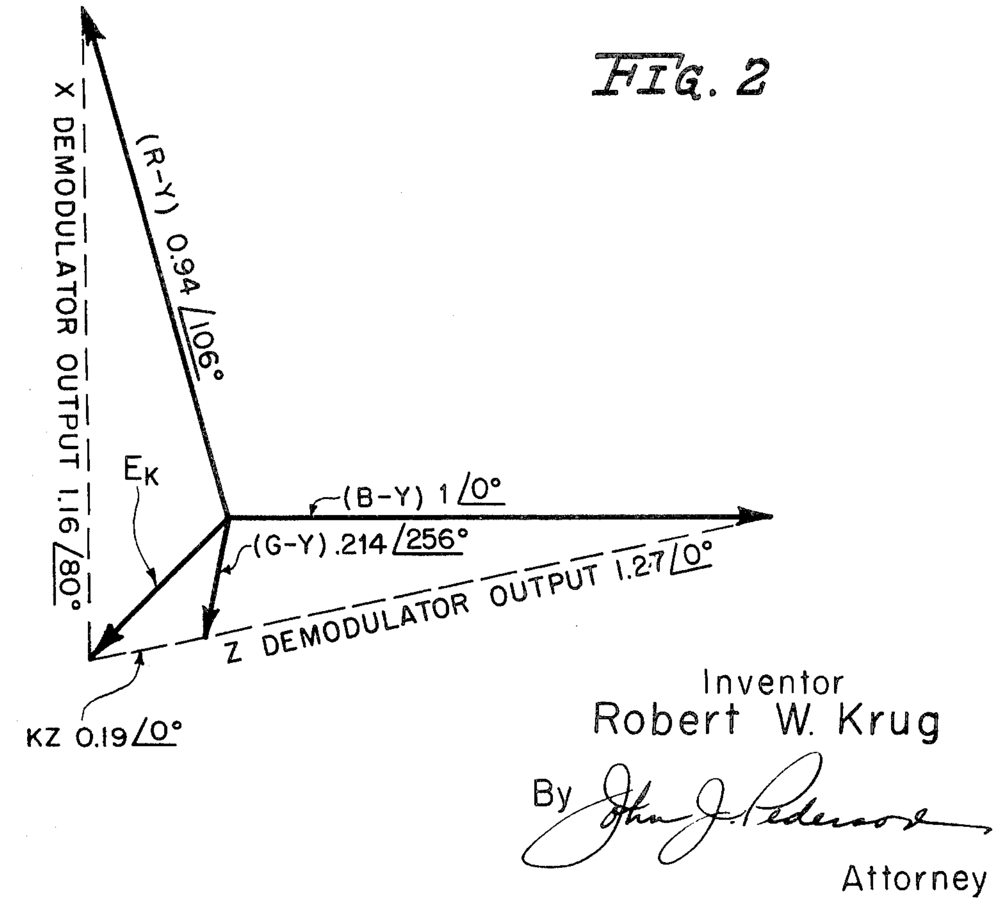
FIG. 2 is a vector representation of the functioning of a color-matrix-amplifier system constructed in accordance with the invention.

To obtain the $G-Y$ color-control signal in a system having identical matrix amplifiers it is necessary to matrix the $E_k$ cathode signal with another signal, which, in accordance with the invention, comprises a portion of the Z-demodulator output signal. Referring to the vector diagram of FIG. 2, it is seen that $G-Y$ can be obtained by vectorially adding $E_k$, the voltage developed across common cathode resistor 95, and KZ, a Z-vector signal equal to approximately one-fifth of the available Z-demodulator output. This is exactly what is done in the embodiment of FIG. 1 wherein the full Z-demodulator output signal appears at juncture 51 and resistors 52 and 54 form a voltage divider to develop the KZ vector at juncture 53. The KZ vector is coupled through resistor 72 and capacitor 73 to the control grid 74 of matrix amplifier 75, wherein it is matrixed with the full $E_k$ common cathode vector concurrently applied to cathode 76. Matrix amplifier 75 amplifies the resultant of these two vectors, which is manifested as the desired $G-Y$ color control signal at anode 78.

The $B-Y$, $G-Y$, and $R-Y$ color-control signals developed on the anodes of amplifiers 63, 75 and 85, are coupled through respective resistor-capactor networks to the three control grids of image reproducer 18. Resistors 69, 81 and 92 serve to prevent damage to the control grids of image reproducer 18 should they suddenly be raised to B+ potential as a result of failure or removal of one of the matrix amplifiers, and capacitors 70, 82 and 93 serve to bypass these resistors as to the color-control signals. Independent degenerative feedback networks, comprising resistors 67, 79 and 90, are included in each matrix amplifier stage to improve its bandpass characteristic.

In order that color-control signals accurately representative of $R-Y$, $B-Y$ and $G-Y$ be developed at the control grids of image reproducer 18, it is necessary that the X and Z demodulation axes and the relative values of resistors 52, 54, 59 and 95 be carefully selected. The relative magnitudes of resistors 52 and 54 are chosen so that the Z-axis color information applied to the control grid 74 of $G-Y$ matrix amplifier 75 will, when combined with the signal appearing across common cathode impedance 95, cause a proper $G-Y$ color-control signal to be developed at anode 78. Furthermore, the sum of resistors 52 and 54, which comprises the plate load of the Z-axis demodulator 31, and the value of resistor 59, which comprises the plate load of the X-axis demodulator 32, provide the desired amplitude ratio between the Z and X axis color-information signals. Resistor 72 is made equal to resistor 52 so that the input impedance of $G-Y$ matrix amplifier 75 will be approximately equal to that of the $B-Y$ and $R-Y$ amplifiers 63 and 85.

It will be appreciated that other axes of demodulation may be used without departing from the nature and advantages of the invention. The particulator vectors chosen for the $B-Y$, $R-Y$ and $G-Y$ control signals in FIG. 2 were chosen to give faithful color reproduction with present phosphor colors and phosphor efficiencies. Furthermore, although $R-Y$, $B-Y$ and $G-Y$ color-difference type control signals are produced by the preferred embodiment of FIG. 1, it would be possible to generate other types of control signals, R, B and G primary control signals, or color-difference signals at other than R, B and G axes.

Common cathode resistor 95 illustrates but one possibility for cross-coupling the matrix amplifiers. Other cross-coupling schemes, such as an active Y amplifier device, may be substituted for the cathode impedance without departing from the true nature of the invention. Furthermore, matrix amplifiers 63, 75 and 85 may comprise solid state devices instead of the triode vacuum tubes of FIG. 1. For reasons of clarity, certain elements of the image reproducer 18 are not shown, e.g., screen grids, suppressor grids and ultor electrode, but these are essentially conventional in design and need not be considered in analyzing the invention.

Figure 3:
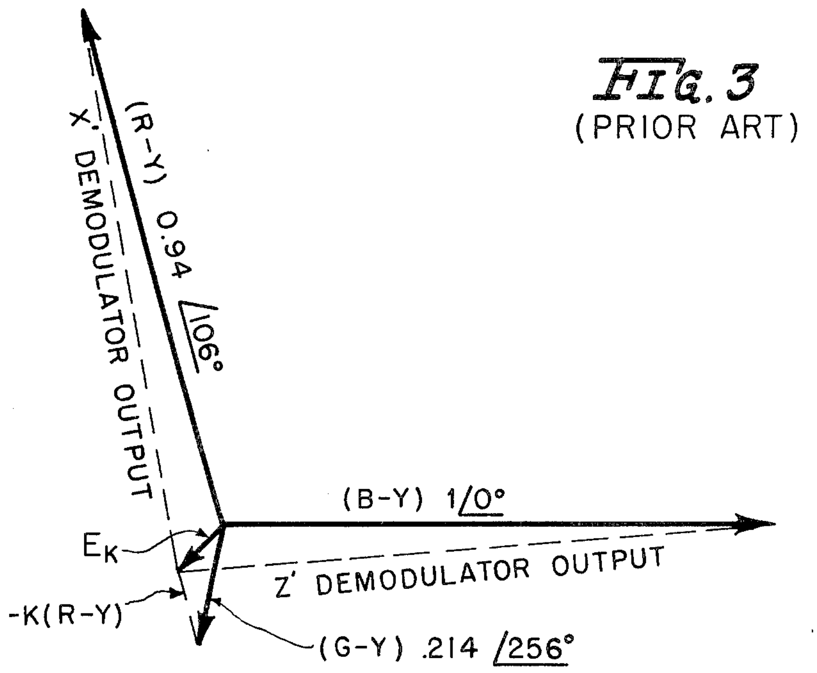
FIG. 3 is a vector representation of the functioning of a prior art color matrix-amplifier system.

The advantages of the present circuit can be better appreciated by referring to the vector diagram of FIG. 3, which illustrates the operation of a prior art arrangement for obtaining the $G-Y$ color-control signal. In this circuit the $B-Y$ and $R-Y$ control signals are derived from X' and Z' color-information signals in much the same manner as in the circuit of the invention, with the exception that the voltage $E_k$ developed across the common cathode resistor is of slightly lower magnitude and the demodulation axes of the X' and Z' signals are shifted slightly from their X and Z counterparts in FIG. 2. However, here the similarity ends for $G-Y$ is obtained in a different manner. In the prior art circuit a component $-K(R-Y)$, representing a negative portion of the developed $R-Y$ color-control signal, is vectorially added to the $E_k$ cathode voltage component in proportions which cause the desired G—Y control signal to be produced by the $G-Y$ matrix amplifier. While the desired color-control signals are produced, the practical application of the prior art method requires the use of a coupling resistor between the anode of the $R-Y$ matrix amplifier and the control grid of the $G-Y$ matrix amplifier which results in a serious degradation in demodulator system performance by preventing the use of stabilizing degenerative feedback in connection with the $G-Y$ matrix amplifier. In fact, it causes the operation of the $G-Y$ amplifier to be undesirably dependent on the operation of the $R-Y$ amplifier.

A demodulator system constructed in accordance with the invention may comprise three identical matrix amplifier stages, each with its own independent feedback network. All stages may have substantially the same bandwidth characteristic and require the same amount of video-frequency peaking. The principal object of the invention, to enable use of an economical X and Z type demodulator-matrix combination with accurate results as to both hue and saturation while utilizing standard color cathode-ray tube drive and biasing arrangements, is accomplished with improved circuit economy, operating stability and color fidelity.

The following are a set of component values for the circuit of FIG. 1 which have been found to provide satisfactory operation in accordance with the invention. It will be appreciated that these values are given by way of example, and that other values may be substituted therefor without departing from the principles of the present invention.

18—256P22A
31, 32—6BV11
41, 42—150 ohms
45, 46—22,000 ohms
47, 48—.05 microfarad
50, 57—696 millihenries
52, 72—3600 ohms
54—680 ohms
55, 60—33 picofarads
59—3900 ohms
61, 73, 86—.01 microfarad
63, 75, 85—6MJ8
65, 77, 88—1 megohm
67, 79, 90—82,000 ohms
68, 80, 91—27,000 ohms
69, 81, 92—100,000 ohms
70, 82, 93—.01 microfarad
95—470 ohms
B+—270 volts While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a chrominance demodulator system for a television receiver having a source of composite chrominance signals and a color image reproducer operable from first, second and third color control signals;
- demodulator means for deriving first and second color-information signals, each of a phase different from that of any of said color control signals, from said composite chrominance signal;
- means for developing a cross-coupling signal representing the negative vector sum of said color control signals;
- means including a first matrix amplifier for matrixing said first color-information signal with said cross-coupling signal to develop said first color control signal;
- means including a second matrix amplifier for matrixing said second color-information signal with said cross-coupling signal develop said second color control signal;
- and means including a third matrix amplifier for matrixing only said first color-information signal with said cross-coupling signal to develop said third color control signal.

2. A chrominance demodulator system as described in claim 1 wherein said first, second and third matrix amplifiers are substantially identical in design.

3. A chrominance demodulator system as described in claim 1 wherein said first, second and third matrix amplifiers each have independent degenerative feedback networks.

4. A chrominance demodulator system as described in claim 1 wherein said means for developing a cross-coupling signal comprises an impedance common to said first, second and third matrix amplifiers.

5. A chrominance demodulator system as described in claim 4 wherein said common impedance is resistive.

6. In a color television receiver having a source of composite chrominance signals and a color image reproducer, a color demodulator system for developing three primary color-difference signals $R-Y$, $B-Y$ and $G-Y$ for application to said color image reproducer comprising:
- a pair of synchronous demodulators for deriving from said composite chrominance signal a pair of color-difference signals X and Z at predetermined phases different from those of said primary color-difference signals;
- three matrix amplifiers each comprising input, output and common electrodes;
- an impedance connected to the common electrodes of all three of said matrix amplifiers for cross-coupling said matrix amplifiers to develop two of said primary color-difference signals at the output electrodes of two of said amplifiers;
- means for respectively applying said X and Z color-difference signals from said synchronous demodulators to the input electrodes of two of said matrix amplifiers;
- and means coupling one of said synchronous demodulators to the input electrode of the third matrix amplifier to apply thereto a color-difference signal in the same phase as one of said X and Z color-difference signals for matrixing with the signal developed across said impedance to develop the third primary color-difference signal at the output electrode of said third matrix amplifier.

7. A color demodulator system according to claim 6, in which all components of said three matrix amplifiers are respectively identical.

8. A color demodulator system according to claim 6, in which each of said three matrix amplifiers has an independent degenerative feedback circuit connected between its output and input electrodes.

9. A color demodulator system as set forth in claim 6, in which said impedance is resistive.

References Cited

UNITED STATES PATENTS

| | | | |
|---|---|---|---|
| 2,732,425 | 1/1956 | Pritchard | 178—5.4 |
| 2,938,071 | 5/1960 | Pritchard | 178—5.4 |
| 3,351,709 | 11/1967 | Cochran et al. | 178—5.4 |

ROBERT L. GRIFFIN, Primary Examiner
J. C. MARTIN, Assistant Examiner